United States Patent
Puttagunta et al.

(10) Patent No.: US 10,630,690 B2
(45) Date of Patent: Apr. 21, 2020

(54) GROUP ZONING AND ACCESS CONTROL OVER A NETWORK

(71) Applicant: HEWLETT PACKARD ENTERPRISE DEVELOPMENT LP, Houston, TX (US)

(72) Inventors: Krishna B. Puttagunta, Roseville, CA (US); Rupin T. Mohan, Littleton, MA (US); Vivek Agarwal, Littleton, MA (US); Charles J. Newfell, Jr., Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 238 days.

(21) Appl. No.: 15/500,035

(22) PCT Filed: Oct. 31, 2014

(86) PCT No.: PCT/US2014/063554
§ 371 (c)(1),
(2) Date: Jan. 28, 2017

(87) PCT Pub. No.: WO2016/069021
PCT Pub. Date: May 6, 2016

(65) Prior Publication Data
US 2017/0250990 A1 Aug. 31, 2017

(51) Int. Cl.
*H04L 29/06* (2006.01)
*H04L 12/931* (2013.01)
*H04L 29/08* (2006.01)

(52) U.S. Cl.
CPC .......... *H04L 63/101* (2013.01); *H04L 49/351* (2013.01); *H04L 49/354* (2013.01);
(Continued)

(58) Field of Classification Search
CPC ... H04L 41/22; H04L 63/0236; H04L 63/101; H04L 45/00; H04L 67/1097;
(Continued)

(56) References Cited

U.S. PATENT DOCUMENTS 7,464,184 B2  12/2008  Shiga et al.
7,852,841 B2  12/2010  Wijnands et al.
(Continued)

FOREIGN PATENT DOCUMENTS

WO  2013165340  7/2013

OTHER PUBLICATIONS

Chaitanya, S. et al., "Design, Implementation and Evaluation of Security in iSCSI-based Network Storage Systems," (Research Paper), Proceedings of the Second ACM Workshop on Storage Security and Survivability, Oct. 30, 2006, 12 pages, available at http://delivery.acm.org/10.1145/1180000/1179564/p17-chaitanya.pdf?

(Continued)

*Primary Examiner* — Jungwon Chang
(74) *Attorney, Agent, or Firm* — Hewlett Packard Enterprise Patent Department

(57) ABSTRACT

Example implementations relate to hard zoning capabilities for devices using Internet small computer system interface (iSCSI) protocol. For example, a method includes creating a virtual local area network (VLAN) at an Ethernet switch between an initiator and target adapter. The method includes assigning an access control list (ACL) to the VLAN. The method includes segregating a device of a plurality of devices connected to the SAN into a zone group. The method also includes controlling access of a zone group based on the ACL and frame filtering.

5 Claims, 5 Drawing Sheets

(52) U.S. Cl.
CPC .......... *H04L 49/70* (2013.01); *H04L 67/1097* (2013.01); *H04L 69/169* (2013.01); *H04L 49/356* (2013.01)

(58) Field of Classification Search
CPC ..... H04L 49/351; H04L 49/354; H04L 49/70; H04L 69/169; H04L 67/16; H04L 49/356; G06F 15/173; G06F 3/0605
USPC ........................................................ 709/225
See application file for complete search history.

(56) References Cited

U.S. PATENT DOCUMENTS

| | | | |
|---|---|---|---|
| 7,925,778 | B1 | 4/2011 | Wijnands et al. |
| 8,046,446 | B1* | 10/2011 | Karr .................... H04L 67/1097 709/223 |
| 8,230,085 | B2 | 7/2012 | Roa |
| 8,619,774 | B2 | 12/2013 | Nalawade |
| 2003/0023896 | A1 | 1/2003 | Kashyap |
| 2003/0085914 | A1* | 5/2003 | Takaoka ................... H04L 41/22 715/734 |
| 2004/0081196 | A1 | 4/2004 | Elliott |
| 2005/0044199 | A1* | 2/2005 | Shiga ................ H04L 29/12009 709/223 |
| 2005/0053073 | A1 | 10/2005 | Kloth et al. |
| 2006/0047907 | A1* | 3/2006 | Shiga .................... G06F 3/0605 711/114 |
| 2006/0109850 | A1* | 5/2006 | Otani ...................... H04L 45/00 370/395.2 |
| 2006/0114903 | A1 | 6/2006 | Duffy, IV et al. |
| 2007/0104194 | A1 | 5/2007 | Wijnands et al. |
| 2007/0112931 | A1 | 5/2007 | Kuik et al. |
| 2009/0037977 | A1* | 2/2009 | Gai ....................... H04L 63/101 726/1 |
| 2010/0115099 | A1 | 6/2010 | Gu et al. |
| 2010/0142529 | A1 | 6/2010 | Huang et al. |
| 2011/0185089 | A1 | 7/2011 | El Zur et al. |
| 2013/0028135 | A1 | 1/2013 | Berman |
| 2013/0046892 | A1* | 2/2013 | Otani ..................... G06F 15/173 709/226 |
| 2013/0212345 | A1* | 8/2013 | Nakajima ............. G06F 3/0605 711/161 |
| 2013/0223451 | A1 | 8/2013 | Zur et al. |
| 2013/0329743 | A1 | 12/2013 | Gai et al. |
| 2016/0065462 | A1* | 3/2016 | Ayandeh ............. H04L 63/0236 370/392 |

OTHER PUBLICATIONS

Cisco, "iSCSI Configuration," (Web Page), Part 3, Chapter 20, Cisco MDS 9000 Family Fabric Manager Configuration Guide, Release 2.x, copyright 1992-2016, available at http://www.cisco.com/en/US/docs/storage/san_switches/mds9000/sw/rel_2_x/fm/configuration/guide/iscsi.html#wp1672970.

International Search Report & Written Opinion received in PCT Application No. PCT/US2014/035805, dated Jan. 21, 2015, 10 pages.

International Search Report & Written Opinion received in PCT Application No. PCT/US2014/063554, dated Jun. 4, 2015, 15 pages.

Juniper Networks, "QFabric System," (Research Paper), Data Sheet, Oct. 2013, 11 pages, available at http://www.juniper.net/us/en/local/pdf/datasheets/1000393-en.pdf.

Charlie Schluting, "Storage Networking 101: Understanding Fibre Channel Zones," Aug. 22, 2007, <http://www.enterprisenetworkingplanet.com/netsp/article.php/3695836/Storage-Networking-101-Understanding-Fibre-Channel-Zones.htm>.

Simon Gordon, "SAN zoning: What is zoning and what are the different types of zoning?," Feb. 2003, <http://searchstorage.techtarget.com/tip/Zoning-part-1-An-overview-of-zoning>.

Stevenu, "Understanding FC (and FCoE) fabric configuration in 5 minutes or less," Mar. 20, 2012, <https://blog.osnexus.com/2012/03/20/understanding-fc-fabric-configuration-5-paragraphs/>.

Wikipedia, "Virtual LAN," Sep. 23, 2014, <https://en.wikipedia.org/w/index.php?title=Virtual_LAN&oldid=626715447>.

\* cited by examiner

GROUP ZONING AND ACCESS CONTROL OVER A NETWORK

BACKGROUND

Internet small computer system interface (iSCSI) is one of the two major storage protocols in converged network datacenters, which also includes Fibre Channel over-Ethernet (FCoE). iSCSI uses Ethernet as a physical connection between computers and peripheral devices for transferring data. iSCSI plays a key role in converged network datacenter scenarios.

BRIEF DESCRIPTION OF THE DRAWINGS

Certain examples are described in the following detailed description and in reference to the drawings, in which.

DETAILED DESCRIPTION OF SPECIFIC EXAMPLES

The iSCSI protocol was not designed to facilitate zoning in an Ethernet fabric. Additionally, no complete zoning solution is used that provides adequate security for iSCSI fabrics, and this presents a major disadvantage for iSCSI when compared to other protocols, especially for enterprise-level data center fabrics or configurations. The current techniques propose a new concept called "Ether Zoning" to make Ethernet fabrics more secure and efficient. The Ether Zoning concept described herein permits iSCSI fabrics to providing zoning capabilities at the frame level for the iSCSI protocol. These techniques can elevate iSCSI into an Enterprise class storage protocol for deployment in high-end datacenters.

In various examples described herein, a step-by-step procedure on achieving group zoning at the frame level is provided for the iSCSI protocol. In examples described herein, zone configuration can be implemented target side through use of an in-band command and response mechanism, and creation of zone groups can be automated. A storage administrator can add an initiator target port with an appropriate access level through creating and modifying zones initiated by the target. The current techniques more efficient and practical to implement, and without, in many cases, changing existing infrastructure.

Examples of the Ether Zoning techniques herein describe a method to configure an Ethernet fabric for iSCSI protocol. Part of the so-called Ethernet fabric can include an iSCSI initiator that can be announced to an Ethernet switch. The techniques to enable Ether Zoning can include acquiring a list of iSCSI initiators, and sending the list to the Ethernet switch. The techniques can also include sending a pre-defined "add zone" command from an iSCSI target adapter to the Ethernet switch. In some examples, VLANs can be created between an iSCSI initiator and a target port, and an access control list (ACL) can be assigned to a VLAN, thereby enabling the zoning scheme described herein.

Figure 1:
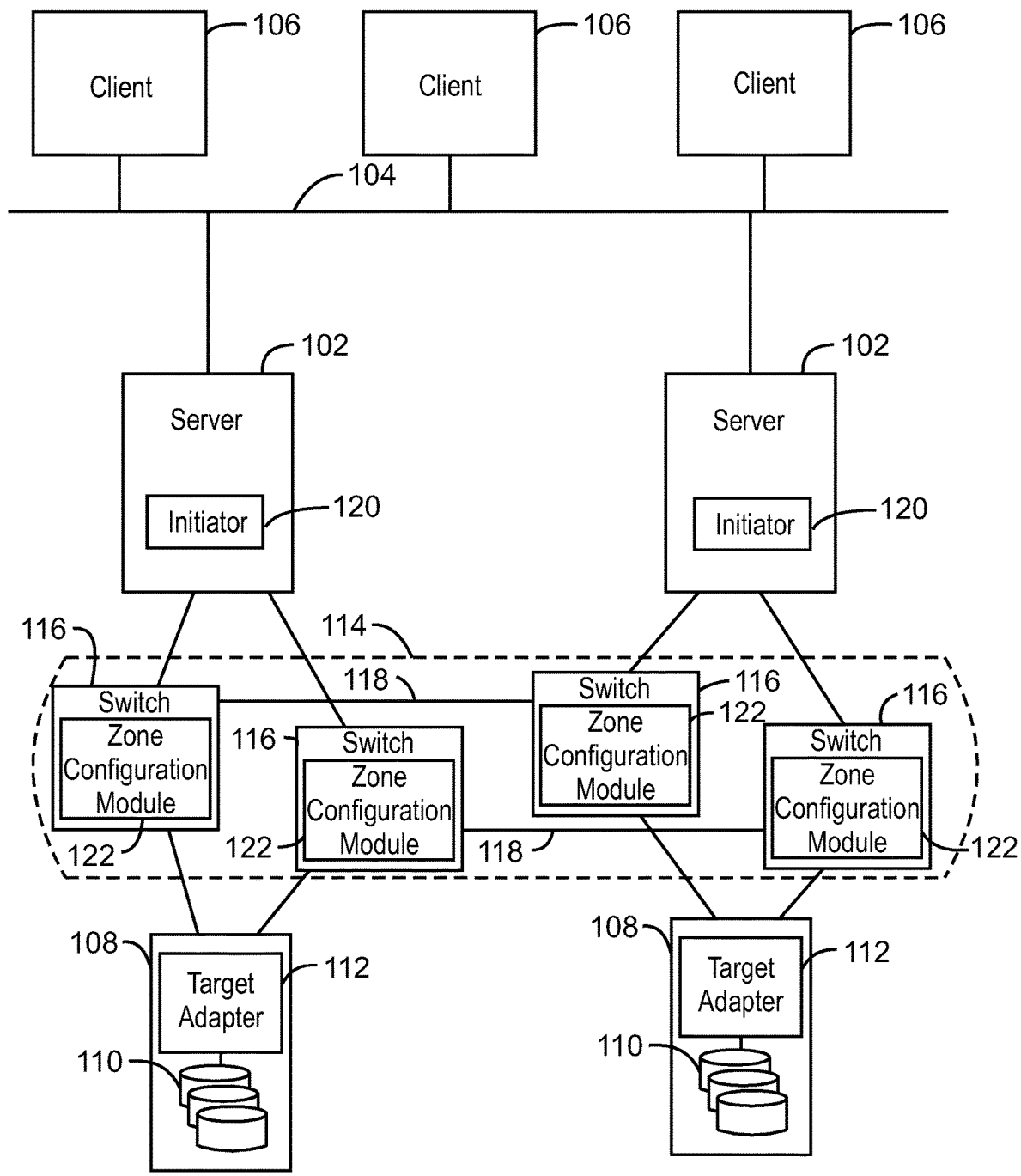
FIG. 1 is a diagram of a server network in accordance with examples of group zoning for iSCSI systems disclosed herein.

FIG. 1 is a diagram of a server network 100 in accordance with examples of group zoning for iSCSI systems disclosed herein. As shown in FIG. 1, the server network 100 may include a number of servers 102 operatively coupled by a communications network 104, for example, a wide area network (WAN), a storage area network (SAN), network attached storage (NAS), local area network (LAN), virtual private network (VPN), the Internet, and the like. The communications network 104 may be a TCP/IP protocol network, or any other appropriate protocol. Any number of client devices 106 may access the servers 102 through the communications network 104. The server network 100 may also include data storage systems 108 that include storage devices 110, such as an array of physical storage disks. The storage devices 110 can be connected to a target adapter 112. The servers 102 may access the data storage systems 108 through a storage area network (SAN) 114, which may include a plurality of switches 116 coupled by data links 118, for example, Ethernet interface connections, and iSCSI interfaces. The Ether Zoning techniques described herein are implemented for systems that use iSCSI as the data transfer protocol across the server network 100.

In addition to the target adapter 112 connected to storage devices 110, an initiator 120 is connected to server 102. The target adapter 112, a switch 116, and the initiator 120 are in communication with one another, and are to implement the Ether Zoning techniques described herein. The initiator 120 acts as a host adapter on a server 102. The target adapter 112 is configured to send an "add zone" multicast command to a switch 116. The "add zone" command can be in response to an initiator 120 being added or provisioned to target adapter 112 on network 100, so that an initiator 120 can communicate with a storage device 110 of the data storage system 108. A target port of the target adapter 112 can be configured as part of a particular zone group.

A switch 116 of the plurality of switches can include a zone configuration module 122. The zone configuration module 122 is to enforce Ether Zoning as described herein at the switch 116. The zone configuration module 122 can allow the switching infrastructure, which includes the target adapter 112, switch 116, and initiator 120, for example, to automatically enforce hard zoning at the frame level so that frames are only forwarded if the destination address is in the same zone. Segregation between selected groups of host devices can be enforced, for example, by configuring appropriate VLANs, and constructing ACLs depending on additional specified criteria. A resulting iSCSI peer zone can be configured over the server network 100.

Those of ordinary skill in the art will appreciate that the configuration of the server network 100 is but one example of a network that may be implemented for the techniques described herein. Those of ordinary skill in the art would readily be able to modify the described server network 100 based on design considerations for a particular system. For example, a server network 100 in accordance with embodiments of the present invention may include any suitable number of data centers, and each data center may include any suitable number of physical servers 102 and any suitable number of data storage systems 108. Further, each server 102 may include one or more virtual machines (not shown), each of which may be migrated to any other suitable server 102.

Figure 2:
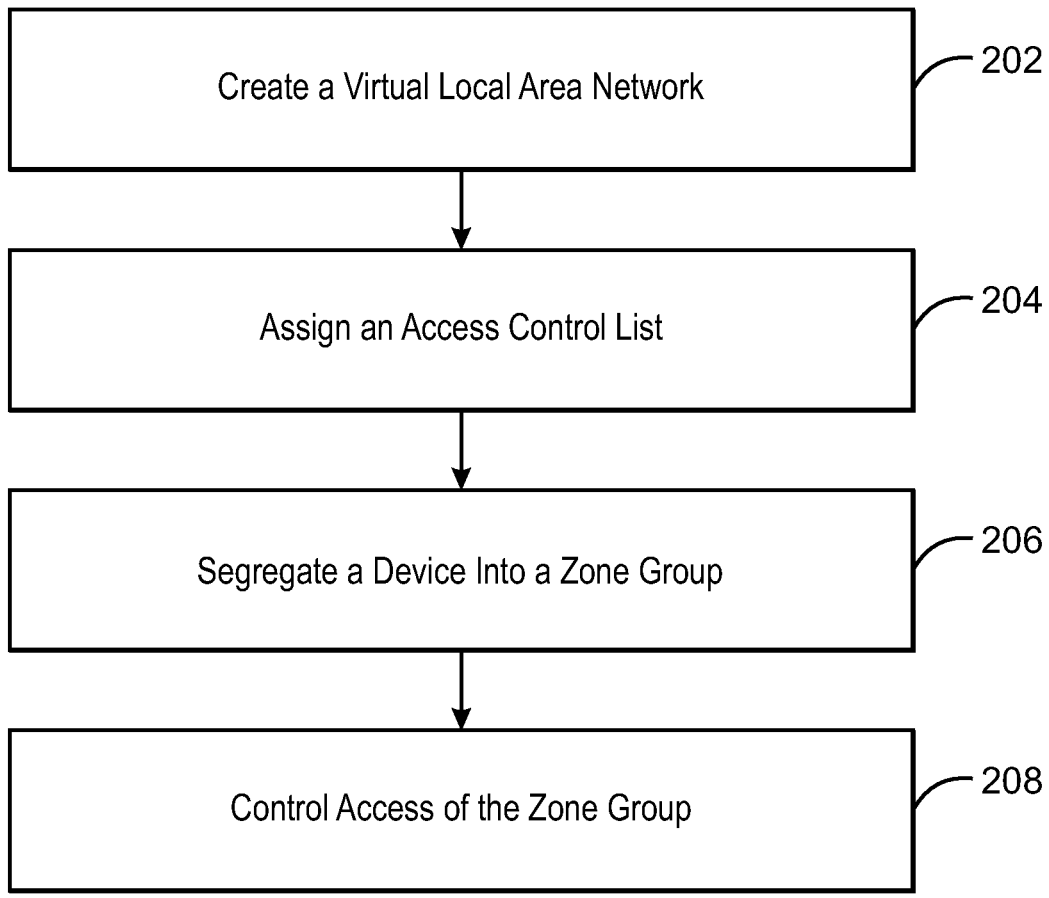
FIG. 2 is a process flow diagram of an example method to implement an Ethernet fabric for iSCSI zoning.

FIG. 2 is a process flow diagram of an example method 200 to implement an Ethernet fabric for iSCSI zoning. The method 200 can be implemented using the SAN and network server 100 described with respect to FIG. 1, for example. The method 200 begins at block 202, where a virtual local area network (VLAN) is created at an Ethernet switch. The Ethernet switch can be part of a Storage Area Network (SAN). The VLAN is to include the appropriate configuration and separation of specified devices on the server network 100.

At block 204, an access control list (ACL) is assigned to the VLAN. The access control list is used to ensure the desired exchange of information between devices. Communication paths are established by security access. For example, access can be selectively permitted only between a pair of devices, or access can be denied, for example, from an initiator to a target port. The ACL is configured on the switch, and resides on the switch hardware to filter traffic at the frame level as defined in ACL rules.

At block 206, a device connected to the SAN is segregated into a zone group. The device can be a host device such as a client computer device, virtual device, server, or some other computer device, for example. The zone group can be defined for a device connected to the network that is attempting to access a certain target on the network.

At block 208, the access of the zone group is controlled. In some examples, the zone group access privileges can be defined based on the access control list. In some examples, the zone group access privileges can be defined based on frame filtering. In some examples, both frame filtering and an access control list can be used to define the access privileges of a zone group.

The method 200 of FIG. 2 is not intended to indicate that method 200 is to include all of the steps shown in FIG. 2. Further, any number of additional steps may be included within the method 200, including, for example, steps described with respect to the method in FIG. 3.

Figure 3:
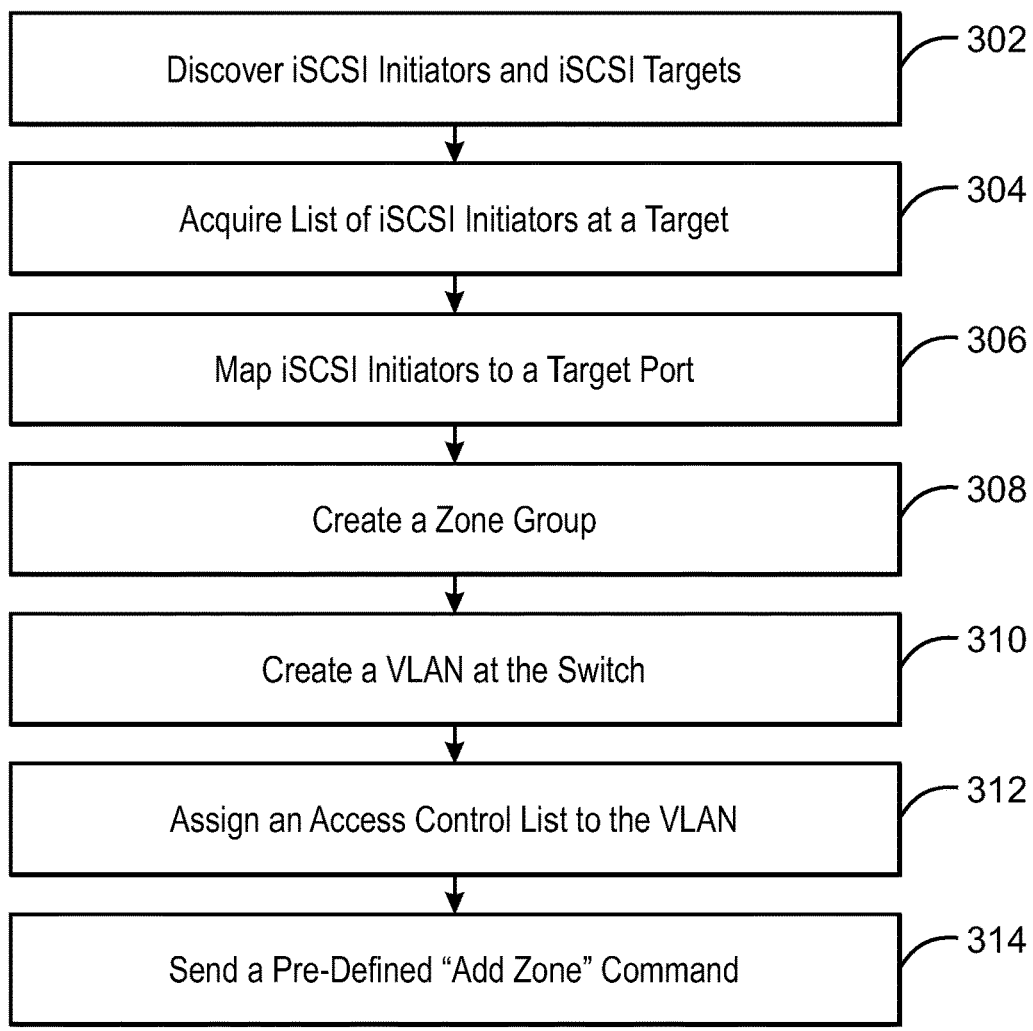
FIG. 3 is a process flow diagram of an example method to implement an Ethernet fabric for iSCSI zoning.

FIG. 3 is a process flow diagram of an example method 300 to implement an Ethernet fabric for iSCSI zoning in greater detail. The method 300 can be implemented using the SAN 114 and server network 100 described with respect to FIG. 1, and the computer-readable media 500 of FIG. 5, for example. The method 300 begins at block 302, at which iSCSI initiators and iSCSI target adapters are discovered. The initiators and targets can be discovered using, for example, multicast announcements. In such an example, the initiators and targets announce themselves to an iSCSI Ethernet switch using a multicast protocol to a pre-defined multicast address group. The switch is configured to collect information and compile the information into a name server database.

At block 304, the target is configured to acquire a list of iSCSI initiators. At this stage, the target sends a command asking for the list of all initiators. In some examples, the command sent by the target can be a multicast command. The switch can respond by sending the list of initiators to the target. The switch can respond by sending, for example, a unicast response frame to the target. This example command and response mechanism can be used to develop the configuration of initiators and targets for a particular zone.

At block 306, an iSCSI initiator is mapped to a target port of an iSCSI adapter. This can be done by a storage administrator. A pre-defined zoning configuration can be stored and implemented.

At block 308, a zone group is created. The zone group is to segregate a device of a plurality of devices. The zone group can also control access to a specific device. Additionally, the zone group can, for example, segregate a device from among other devices on a network. Access to storage, for example, and other resources on the network can also be controlled through configuring a zone group.

At block 310, a virtual local area network (VLAN) is created. The VLAN is created to implement a specific, pre-defined secure network configuration. The VLAN is created at the iSCSI Ethernet switch, and between the iSCSI initiator and a target port of the iSCSI target adapter. At block 312, an access control list (ACL) is assigned to the VLAN. The iSCSI Ethernet switch can, in some examples, configure the access control list.

At block 314, the iSCSI target adapter is configured to send an "add zone" command to the iSCSI Ethernet switch. To send the "add zone" command, the target sends the switch a unique pre-defined add zone command, along with target port configuration and a list of the initiators that are to communicate with the specific target port. In some examples, the Ether Zoning techniques for the iSCSI protocol described herein can be effectively implemented using the in-band, multicast commands. Thus, the Ether Zoning technique can be, for example, initiated by the target and configured by the switch.

The method 300 of FIG. 3 is not intended to indicate that method 200 is to include all of the steps shown in FIG. 3. Further, any number of additional steps may be included within the method 300, including, for example, steps described with respect to components of the diagram in FIG. 4.

Figure 4:
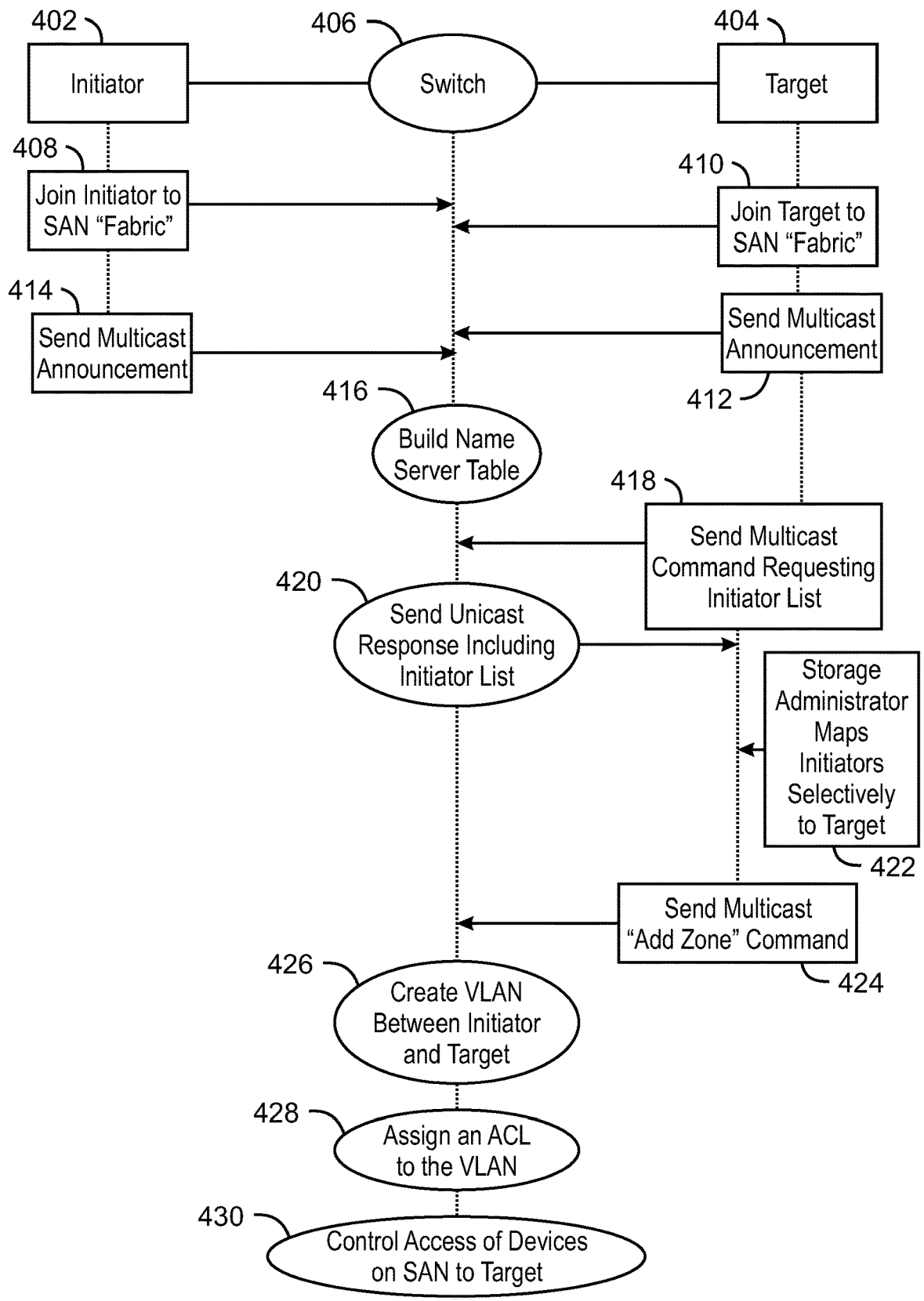
FIG. 4 is a process flow diagram showing an example process of Ether Zoning.

FIG. 4 is a process flow diagram showing an example process of Ether Zoning. The process flow diagram 400 shows interactions between an initiator 402, a target 404, and a switch 406. The initiator 402 is configured as an adapter for a host device. The target 404 is configured to initiate the Ether Zoning techniques discussed herein. The switch 406 is to control communication and configure zone groups across a Storage Area Network (SAN).

At block 408, an initiator 402 is joined to the SAN. At block 410, a target 404 is joined to the Ethernet fabric created over the SAN. The network can be utilized, for example, as a type of fabric that is well defined. In such an example, a fabric is provided by links between initiators and targets 304, where different links and access to them can be clearly defined.

The Ether Zoning technique continues at block 412, where a multicast announcement is sent to the switch 406 from the target 404. At block 414, the connected initiators 402 also send a multicast announcement to the switch 406. The announcements are made to a pre-defined multicast address group. At block 416, the switch 406 builds a name server table, which can be, for example, a database, created and stored in the switch, based on the information that is compiled from the multicast announcements made by targets 404 and initiators 402. The name server table can include, for example, a list of initiators and a list of targets that are connected over the SAN.

At block 418, a multicast command is sent to the switch 406 from the target 304 requesting the list of the initiators on the network. This is an example "command" of the in-band command and response mechanism. At block 420, the switch responds to the target by sending a unicast response including the list of initiators. This is an example "response" of the in-band command and response mechanism.

At block 422, a storage administrator can selectively map an initiator to a target port of an iSCSI target adapter. The storage administrator can map the target and the initiators for certain zone groups, and can provision storage volumes, for example. The target drives the Ether Zoning technique described herein at the switch, communicating with the switch and fabric via commands to configure the zones.

At block 424, the target 404 sends a multicast "add zone" command to the switch 406. The target 404 issues commands to the switch 406, and the switch 406 then configures the zone groups across the SAN. Zone groups of iSCSI target ports are defined by segregating between selected groups of devices, and permitting data transfer between or among specified zone groups.

At block 426, a VLAN can be created between an initiator 402 and a port of a target 404. The VLAN is configured to enforce zoning in the fabric as per the commands received by the switch 406. This Ether Zoning technique can implement segregation between selected groups of devices on the Ethernet fabric. This segregation can be enforced by configuring VLANs, and then creating appropriate access control lists (ACLs) depending on additional specified criteria.

At block 428, an access control list is assigned to a particular VLAN. The ACL defines the control of access between a target 404 and associated initiators 402 (or between initiators) in the VLAN. At block 430, the access of devices on a network to a particular target 404 is controlled by creating an iSCSI peer zone. FIG. 4 describes how Ether Zoning is established, and how a SAN becomes more deterministic and more secure. The concept of Ether Zoning described herein, when configured by the initiator 402, target 404, and adapter 406, determines the network for which zones can be assigned. An iSCSI peer zone permits access only between initiators 402 and the specified port of a certain target 404, while denying any access between initiators 402. Information is to be transferred and accessible only if the correct frames are being received. Initiators 402 that are sending the correct frames are allowed to communicate with a particular target 404. These techniques can thus be used to implement group zoning and frame filtering, where restrictions on communication of a device of a particular zone group is enforced. A zone group can be created to segregate a device, and to control access to the device, and to control access among the device and other devices that may be connected to the network.

The switching infrastructure described can, for example, automatically enforce hard zoning at the frame level so that frames are only forwarded if the destination address is in the same zone, otherwise the frames are dropped. Hard zoning is zoning that can be implemented in hardware, and provides additional security over soft zoning that can be implemented in software. The Ether Zoning technique is initiated by multicast announcements by target and host adapters, and the information compiled by an Ethernet switch. The specific initiators that are to access a target port are identified. There is no equivalent mechanism to the Ether Zoning techniques proposed herein that are employed for Ethernet fabrics. In this approach for iSCSI systems, standard multicast frames are utilized between a switch and end devices to exchange information, pass commands, and to obtain responses. Ether Zoning also enables the devices in a given SAN to join a well-defined multicast group, and communicate among the devices using standard protocol with a predefined multicast group address.

The process flow diagram of FIG. 4 is not intended to indicate that the method 400 is to include all of the steps shown in FIG. 4. Further, any number of additional steps may be included within the method 400, depending on the details of the devices and specific implementation of Ether Zoning functionality described herein. In some examples, steps described with respect to the method of FIG. 2 or FIG. 3 can also be included. The items discussed are not limited to the functionalities mentioned, but the functions could be done in different places, or by different components. Further, any number of additional steps may be introduced for variations of Ether Zoning that may be implemented. One implementation can include, for example, a simple iSCSI zone that utilizes a single VLAN for all iSCSI initiators and iSCSI targets, without requiring access control lists. Another implementation can include, for example use of VLANs based on Quality of Service (QoS) requirements and their priority levels. Another implementation can include, for example, use of a VLAN based on predefined security levels and authentications.

Figure 5:
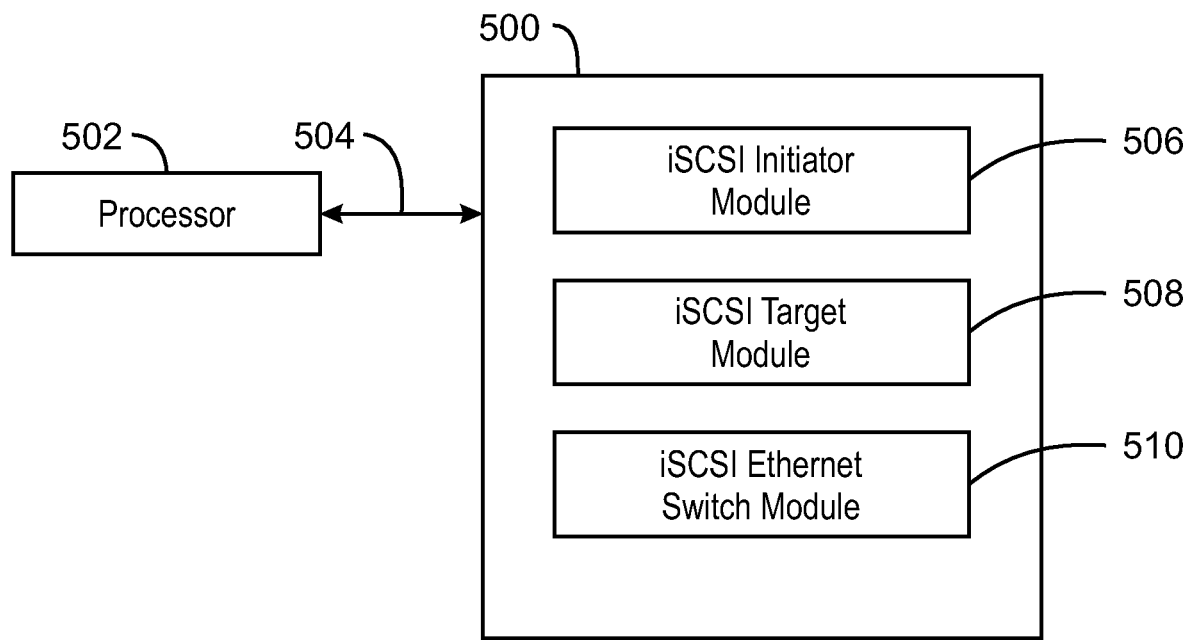
FIG. 5 is an example block diagram showing a non-transitory, computer-readable media that holds code that enables zoning capabilities in an iSCSI system.

FIG. 5 is an example block diagram showing a non-transitory, computer-readable media 500 that holds code that enables zoning capabilities in an iSCSI system. The computer-readable media 500 can be accessed by a processor 502 over a system bus 504. In some examples, the code may direct the processor 502 to perform the steps of the current method as described with respect to FIG. 2 and FIG. 3.

The computer-readable media 500 can include an iSCSI initiator module 506. The iSCSI initiator module 506 is a component of an Ethernet fabric, wherein an initiator can join the fabric. The iSCSI initiator module can be configured to send multicast protocol announcements. In some examples, the multicast announcements can be sent from both the iSCSI initiator module 506, and an iSCSI target module 508 to an iSCSI Ethernet switch module 510.

The computer-readable media 500 can include an iSCSI target module 508. In some examples, the iSCSI target module 508 can provide a mechanism to exchange information between an end device and a corresponding switch. In some examples, the iSCSI target module 508 can provide a set of commands so that an external management station or a device connected to the switch can pass commands via an in-band operation. In some examples, the iSCSI target module 508 can drive fabric configuration including zoning.

The computer-readable media 500 can include an iSCSI Ethernet switch module 510. The implementation of computer-readable media 500 can provide fabric capabilities in an iSCSI system. The iSCSI Ethernet switch module 510 can utilize standard multicast frames between a target port, an Ethernet switch, and an end device. In some examples, the iSCSI Ethernet switch module 510 can exchange information by, for example, building a name server table, obtaining commands, sending responses, and configuring the Ether Zoning techniques herein. The iSCSI Ethernet switch module 510 in combination with the iSCSI initiator module 506 and iSCSI target module 508 can be used to implement group zoning and frame filtering, where restrictions on communication of a device of a particular zone group can be effectively enforced. The iSCSI Ethernet switch module 510 can create a VLAN between a target port of a device and an initiator. The iSCSI Ethernet switch module 510 can also create an access control list associated with a particular VLAN in order to automatically provide group zoning at the frame level by implementation through various hardware defined herein.

The block diagram of FIG. 5 is not intended to indicate that the computer-readable media 500 is to include all of the components or modules shown in FIG. 5. Further, any number of additional components may be included within the computer-readable media 500, depending on the details of the iSCSI system and specific implementation of Ether Zoning described herein.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method for controlling access to a Storage Area Network (SAN), comprising:
 receiving, at a switch, a request to join an initiator to the SAN;
 receiving, at the switch, a request to join a target to the SAN;
 building, at the switch, a name server table comprising:
  an initiator list including the initiator; and
  a target list including the target;
 sending, from the switch and based on a command requesting the initiator list, a response including the initiator list;
 receiving, at the switch, an add zone command from a target joined to the SAN;
 in response to receiving the add zone command from the target, creating, at the switch, a Virtual Local Area Network (VLAN) between the initiator and an Internet Small Computer Systems Interface (iSCSI) port of the target joined to the SAN;
 assigning, at the switch, an access control list (ACL) to the VLAN;
 creating, at the switch, an iSCSI peer zone to control access to the target;
 permitting, by the switch and based on the iSCSI peer zone, the initiator to access the iSCSI port of the target; and
 denying, by the switch and based on the iSCSI peer zone, a second initiator from accessing the iSCSI port of the target.

2. The method of claim 1, further comprising:
 receiving, at the switch, a command to add a zone group to the SAN;
 configuring, at the switch, zone groups across the SAN such that the added zone group includes the iSCSI port of the target; and
 configuring the VLAN to enforce zoning based on the zone groups across the SAN.

3. The method of claim 1, wherein the switch, upon receiving a frame from the second initiator that is destined for the iSCSI port of the target, drops the frame.

4. The method of claim 1, wherein the second initiator and a second iSCSI port of the target comprise a second VLAN.

5. The method of claim 4, wherein the switch, upon receiving a frame from the second initiator that is destined for the second iSCSI port of the target, sends the frame to the target.

* * * * *